US009658770B2

(12) United States Patent
Choi

(10) Patent No.: US 9,658,770 B2
(45) Date of Patent: May 23, 2017

(54) METHOD AND APPARATUS FOR PROCESSING INPUTTING OF CHARACTER

(71) Applicant: Samsung Electronics Co., Ltd., Gyeonggi-do (KR)

(72) Inventor: Hyun-Suk Choi, Daegu (KR)

(73) Assignee: Samsung Electronics Co., Ltd (KR)

( * ) Notice: Subject to any disclaimer, the term of this patent is extended or adjusted under 35 U.S.C. 154(b) by 317 days.

(21) Appl. No.: 14/316,066

(22) Filed: Jun. 26, 2014

(65) Prior Publication Data

US 2015/0007089 A1    Jan. 1, 2015

(30) Foreign Application Priority Data

Jun. 26, 2013    (KR) .................. 10-2013-0073780

(51) Int. Cl.
*G06F 15/00*     (2006.01)
*G06F 13/00*     (2006.01)
*G06F 3/0488*    (2013.01)

(52) U.S. Cl.
CPC ...... *G06F 3/04886* (2013.01); *G06F 3/04883* (2013.01)

(58) Field of Classification Search
CPC ............................... G06F 3/0488; G06F 3/018
USPC .................. 715/769, 773, 863, 830
See application file for complete search history.

(56) References Cited

U.S. PATENT DOCUMENTS

| 8,816,966 B2 * | 8/2014 | Yoshida .................. G06F 3/018 345/171 |
| 2008/0120102 A1 * | 5/2008 | Rao .......................... G10L 15/22 704/235 |
| 2008/0284744 A1 | 11/2008 | Park et al. |
| 2009/0044139 A1 * | 2/2009 | Shin ....................... G06F 3/0488 715/769 |
| 2013/0080964 A1 * | 3/2013 | Shigeta ................. G06F 3/0488 715/773 |

FOREIGN PATENT DOCUMENTS

| KR | 1020080100552 | 11/2008 |
| KR | 20100067192 | 6/2010 |
| KR | 20100069089 | 6/2010 |
| KR | 1020100121218 | 11/2010 |
| KR | 20120055171 | 5/2012 |
| KR | 101162247 | 7/2012 |

* cited by examiner

*Primary Examiner* — Kevin Nguyen
(74) *Attorney, Agent, or Firm* — The Farrell Law Firm, P.C.

(57) ABSTRACT

Methods and electronic apparatuses for repeatedly inputting a character or number are described. The method includes identifying a predetermined gesture relating to a soft key on a soft keyboard displayed on a touch screen of an electronic apparatus, using the identified predetermined gesture to determine the number of times the at soft key was input, and processing input of the at soft key the determined number of times.

20 Claims, 8 Drawing Sheets

METHOD AND APPARATUS FOR PROCESSING INPUTTING OF CHARACTER

PRIORITY

This application claims priority under 35 U.S.C. §119(a) to Korean Application Serial No. 10-2013-0073780, which was filed in the Korean Intellectual Property Office on Jun. 26, 2013, the entire contents of which are incorporated herein by reference.

BACKGROUND OF THE INVENTION

1. Field of the Invention

The present invention generally relates to a method of inputting a character, and more particularly, to a method of inputting a character by using a touch screen.

2. Description of the Related Art

In recent years, various services and additional functions provided in electronic apparatuses are being used more and more. In order to improve an effective value of electronic apparatuses and satisfy various desires of users, various applications executable in electronic apparatuses have been developed.

Both basic applications manufactured by a manufacturer of the electronic apparatus and installed in the electronic apparatus and additional applications downloaded from websites selling applications on the Internet may be stored and executed in the electronic apparatus. The additional applications may be developed by general developers and registered in the selling websites. Thus, anyone who develops applications can freely sell the developed applications to users of the electronic apparatus. Accordingly, many thousands of applications for current electronic apparatuses are provided for a fee or free of charge, according to the product.

Thus, situations where characters are input through the electronic apparatuses are also increasing as applications, such as messaging applications or social media applications, are used more and more. Accordingly, there is a need for environments where users can more rapidly and more exactly input a character.

SUMMARY OF THE INVENTION

Accordingly, the present invention is designed to address the problems described above and provide at least the advantages discussed above. Accordingly, an aspect of the present invention is to provide a method and an apparatus for processing inputting of a character such that the character can be rapidly and repeatedly input through a simple touch input.

According to an aspect of the present invention, a method of repeatedly inputting a character or number in an electronic apparatus is provided, the method including identifying one or more predetermined gestures relating to at least one soft key on a soft keyboard displayed on a touch screen of the electronic apparatus; using the identified one or more predetermined gestures to determine the number of times the at least one soft key is input; and processing input of the at least one soft key the determined number of times.

According to another aspect of the present invention, a method of repeatedly inputting a character or number in an electronic apparatus is provided, the method including identifying a first touch input event of at least one character soft key on a soft keyboard displayed on a touch screen of the electronic apparatus; before there is a release event corresponding to the first touch event, identifying a second touch input event of at least one number soft key on the soft keyboard; and processing the input of the at least one character soft key a number of times corresponding to a number allocated to the at least one number soft key.

According to yet another aspect of the present invention, an electronic apparatus is provided, including a touch screen configured to display information and to detect a touch input event by a user; at least one controller; and a memory configured to store at least a character input program, wherein the character input program comprises instructions configured to be executed by the controller, the instructions for performing the steps of identifying one or more predetermined gestures relating to at least one soft key on a soft keyboard displayed on the touch screen; using the identified one or more predetermined gestures to determine the number of times the at least one soft key is input; and processing input of the at least one soft key the determined number of times.

According to another aspect of the present invention, an electronic apparatus is provided including a touch screen configured to display information and to detect a touch input event input by a user; at least one controller; and a memory configured to store at least a character input program, wherein the character input program comprises instructions configured to be executed by the controller, the instructions for performing the steps of identifying a first touch input event of at least one character soft key on a soft keyboard displayed on the touch screen; before there is a release event corresponding to the first touch event, identifying a second touch input event of at least one number soft key on the soft keyboard; and processing the input of the at least one character soft key a number of times corresponding to a number allocated to the at least one number soft key.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

The following description with reference to the accompanying drawings is provided to assist in a comprehensive understanding of embodiments of the invention. It includes various specific details to assist in that understanding but these are to be regarded as mere examples. Accordingly, those of ordinary skilled in the art will recognize that various changes and modifications of the embodiments described herein can be made without departing from the scope and spirit of the invention. In addition, descriptions of well-known functions and constructions may be omitted for clarity and conciseness. The present invention is defined by the appended claims and their equivalents.

The terms and words used in the following description and claims are not necessarily limited to the dictionary meanings, and are merely used to enable a clear and consistent understanding of the embodiments of the invention. Accordingly, it should be apparent to those skilled in the art that the following description of embodiments of the present invention is provided for illustration purpose only and not for the purpose of limiting the invention, which is defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
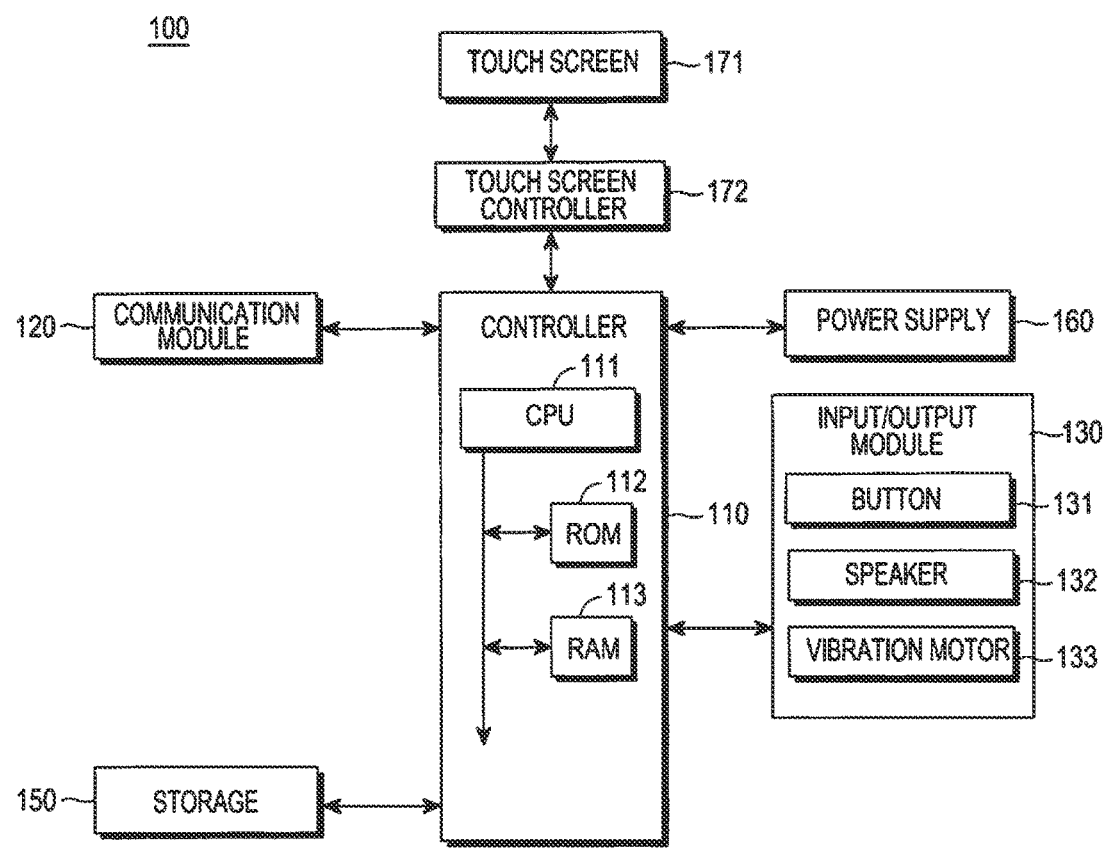
FIG. 1 is a block diagram schematically showing an electronic apparatus to which a method of inputting a character according to an embodiment of the present invention is applied.

FIG. 1 illustrates an electronic device according to an embodiment of the present invention. Referring to FIG. 1, an electronic device 100 may include a controller 110, a storage 150, a power supply 160, a touch screen 171, and a touch screen controller 172.

The controller 110 may include a Central Processing Unit (CPU) 111, a Read Only Memory (ROM) 112 storing a control program for controlling the device 100, and a Random Access Memory (RAM) 113, which temporarily stores signals or data received from the outside of the device 100, or is used as a storage area for the operations performed in the device 100. The CPU 111, ROM 112 and RAM 113 may be interconnected via an internal bus. The controller 110 may control the communication module 120, the Input/Output (I/O) module 130, the storage 150, the power supply 160, the touch screen 171, and the touch screen controller 172. The controller 110 may be comprised of a single core, or may be comprised of multiple cores such as dual cores, triple cores, and quad cores. It will be apparent to those of ordinary skill in the art that the number of cores is subject to change depending on the characteristics of the terminal.

The storage 150, under control of the controller 110, may store signals or data, which are input/output to correspond to operations of the communication module 120, the I/O module 130, and the touch screen 171. The storage 150 may store a variety of applications and a control program for control of the device 100 or the controller 110.

The term 'storage' as used herein may include the storage 150, the ROM 112 and RAM 113 in the controller 110, and a memory card (for example, a Secure Digital (SD) card or a memory stick) mounted in the device 100. The storage may include a non-volatile memory, a volatile memory, a Hard Disk Drive (HDD), a Solid State Drive (SSD) and the like.

The power supply 160, under control of the controller 110, may supply the power to one or multiple rechargeable batteries mounted in the housing of the device 100. The one or multiple batteries supply power to the device 100. The power supply 160 may supply to the device 100 power received from an external power source through a wired cable that is connected to a connector in the device 100. The power supply 160 may supply, to the device 100, power that is wirelessly received from the external power source by wireless charging technology.

The touch screen 171 may display User Interfaces (UIs) corresponding to various services (for example, calls, data transmission and the like) for the user, based on the terminal's Operation System (OS). The touch screen 171 may transfer an analog signal corresponding to at least one touch entered on a UI to the touch screen controller 172. The touch screen 171 may receive at least one touch input through the user's body (for example, fingers) and/or a touch input means (for example, a stylus pen). The touch screen 171 may receive a continuous movement input of at least one touch. The touch screen 171 may transfer an analog signal corresponding to a continuous movement of an input touch to the touch screen controller 172.

The touch screen 171 may be implemented as, for example, a resistive type, a capacitive type, an infrared type, or an acoustic wave type.

The touch screen controller 172 controls output values from the touch screen 171 and controls the display data provided from the controller 110 so that it may be displayed on the touch screen 171. The touch screen controller 172 converts analog signals received from the touch screen 171 into digital signals (for example, X/Y coordinates) and transfers them to the controller 110. The controller 110 may control the touch screen 171 using the digital signals received from the touch screen controller 172. For example, in response to a touch event or a hovering event, the controller 110 may select or execute a related shortcut icon displayed on the touch screen 171. The touch screen controller 172 may be incorporated into the controller 110.

In addition, the electronic device 100 according to an embodiment of the present invention may include communication module 120 and I/O module 130.

The communication module 120 may include at least one of a cellular module, a Wireless Local Area Network (WLAN) module, and a short-range communication module.

The cellular module is configured to connect the device 100 to the external device by mobile communication via at least one or more antennas, under control of the controller 110. The cellular module exchanges wireless signals for voice calls, video calls, Short Message Service (SMS) messages and/or Multimedia Messaging Service (MMS) messages, with cellular phones, smart phones, tablet Personal Computers (PCs) and/or other devices, whose phone numbers are stored or registered in the device 100.

The WLAN module, under control of the controller 110, may be connected to the Internet in a place where a wireless Access Point (AP) is installed. The WLAN module supports IEEE 802.11x, the WLAN standard defined by Institute of Electrical and Electronics Engineers (IEEE). The WLAN module may drive the Wi-Fi Positioning System (WPS) that identifies location information of the terminal equipment using the location information provided by a wireless AP to which the WLAN module is wirelessly connected.

The short-range communication module, a module that wirelessly handles short-range communication with the device 100 under control of the controller 110, may handle communication based on short-range communication standards such as Bluetooth, Infrared Data Association (IrDA), WiFi-Direct, and Near Field Communication (NFC).

The I/O module 130 may include at least one of a button 131, a speaker 132, and a vibration motor 133.

The button 131 may be formed on the front, side and/or rear of the housing of the device 100, and may include at least one of a power/lock button, a volume button, a menu button, a home button, a back button, and a search button.

The speaker 132, under control of the controller 110, may output sounds corresponding to various signals (for example, wireless signals, broadcast signals and the like) from the cellular module, the WLAN module and the short-range communication module. One or multiple speakers 132 may be formed in one or multiple proper positions of the housing of the device 100.

The vibration motor 133 may convert electrical signals into mechanical vibrations under control of the controller 110. One or multiple vibration motors 133 may be formed in the housing of the device 100.

The speaker 132 and the vibration motor 133 may operate depending on the set state of the volume operating mode of the device 100.

Figure 2A:
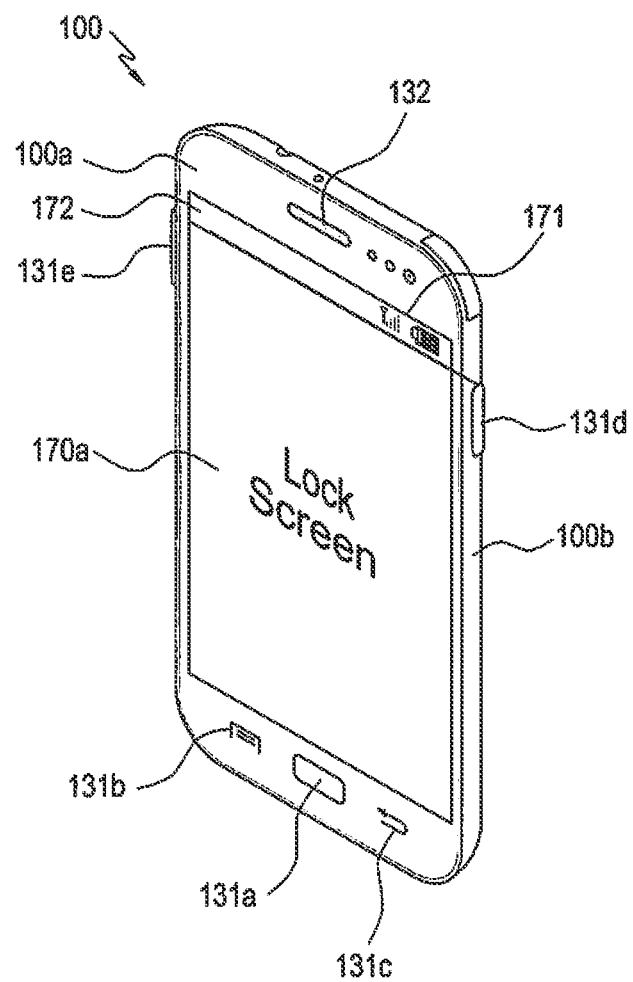
FIGS. 2A and 2B are front perspective views showing an electronic apparatus to which a method of inputting a character according to an embodiment of the present invention is applied.
Figure 2B:
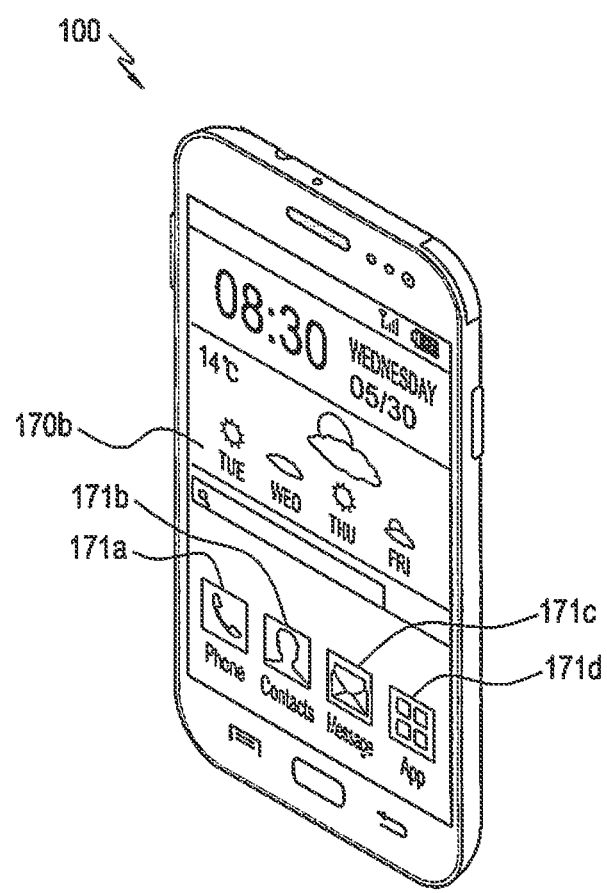

FIGS. 2A and 2B are front perspective views showing an electronic apparatus in which a method of inputting a character according to an embodiment of the present invention is applied.

Referring to FIG. 2A, a touch screen 171 is disposed on a central portion of a front surface 100a of an electronic apparatus 100. The touch screen 171 is largely formed to occupy most of the front surface 100a of the electronic apparatus 100. FIG. 2A shows an example where a lock screen 170a is displayed on the touch screen 171. The lock screen 170a is the first screen displayed on the touch screen 171 when the electronic apparatus 100 is turned on, and provides an environment where a user can access the electronic apparatus 100 by inputting security information (for example, a password, a security pattern, and the like) set by a user. The controller 110 confirms the validity of the security information (for example, a password, a security pattern, and the like) input by a user, and then releases the lock screen 170a to switch into the home screen 170b shown in FIG. 2B.

The lock screen 170a may be configured to receive inputting of a password or a security pattern. Further, when a user does not set separate security information, the lock screen 170a may be configured to switch into the home screen 170b by a touch input or a drag input of a user instead of receiving an input of the password or the security pattern as described above.

The home screen 170b may include a plurality of pages of different home screens, and the first home screen among the plurality of pages of the different home screens may be a main home screen. Shortcut icons 171a, 171b, and 171c for executing frequently used applications, a main menu switching key 171d, time, weather, and the like may be displayed on the home screen 170b. The main menu switching key 171d makes the touch screen 171 display a main menu screen. A status bar 172 for displaying a state of the electronic apparatus 100 such as a battery charged state, intensity of reception signals, current time, and a volume operation mode may be formed at an upper end of the touch screen 171.

The front surface 100a may have a home button 131a, a menu button 131b, and a back button 131c, which are formed at a lower portion thereof.

Basically, the home button 131a makes the touch screen 171 display the main home screen. For example, in a state where another screen is displayed on the touch screen 171, when the home key 131a is touched, the main home screen is displayed on the touch screen 171. The main home screen 170b illustrated in FIG. 2B is also displayed on the touch screen 171 when the home button 131a is touched while applications are executed on the touch screen 171. Further, the home button 131a may be used to display recently used applications or a task manager on the touch screen 171.

The menu button 131b provides a connection menu which may be used on the touch screen 171. The connection menu may include a widget addition menu, a background screen change menu, a search menu, an edit menu, and an environment setting menu.

The back button 131c may display a screen executed shortly before a current executed screen, or may finish the latest used application.

A speaker 132 may be disposed at an upper central portion of the front surface 100a of the electronic apparatus 100. Further, a power/reset button 131d and a volume button 131e may be, for example, disposed on a lateral surface 100b of the electronic apparatus 100.

Figure 3:
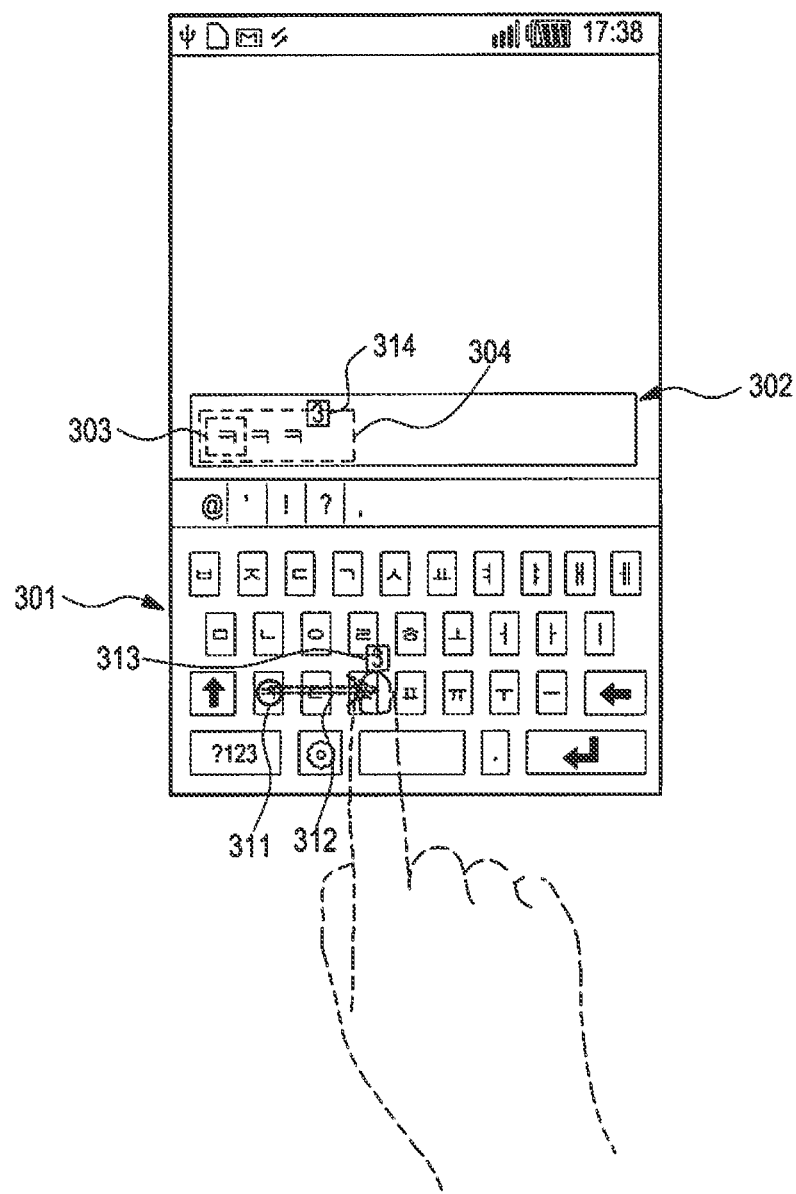
FIG. 3 illustrates an example of an operation of inputting characters by a character input method according to an embodiment of the present invention.

Meanwhile, the touch screen 171 and the controller 110 which are provided in the above-described electronic apparatus 100 can perform a method of inputting a character according to an embodiment of the present invention. In this embodiment, the touch screen 171 displays a soft keyboard 301 as shown in FIG. 3 for inputting a character or a number, and processes inputting of a character (or a number) in response to a touch input event generated in the soft keyboard 301. The soft keyboard 301 displayed on the touch screen 171 has a plurality of soft keys allocated to predetermined areas. The plurality of soft keys have characters (or numbers) which are allocated thereto, displayed thereon, and will be processed in response to a touch input event. Thus, the controller 110 provides data for displaying the soft keyboard 301 including the plurality of soft keys on the touch screen 171 to the touch screen 171, and the touch screen 171 displays the soft keyboard 301 including the plurality of soft keys. When touch screen 171 detects a touch input event while displaying the soft keyboard 301, it provides coordinates of the detected area to the controller 110 through touch screen controller 172. The controller 110 in turn identifies the coordinates of the area where the touch input event is detected, and identifies and processes a character (or a number) allocated to the soft key corresponding to the corresponding area. The controller 110 provides data for touch screen 171 to display a character input window 302 for showing a character 303 (or a number) input through the soft keyboard 301.

Further, the controller 110 may process inputting of a character (or a number) corresponding to a touch input event generated on the soft keyboard 301, based on a character input processing method according to an embodiment of the present invention. That is, the controller 110 may process repeated inputting of a character (or a number) allocated to a soft key in accordance with a length of a drag gesture which starts from the soft key and then is released. For example, as shown in FIG. 3, after a touch input is generated on a soft key 311 to which a character "ᄀ" is allocated, the controller 110 identifies that a drag gesture 312 continuing from the touch input of the soft key 311 is generated, and processes repeated inputting of the character 303 (or the number) allocated to the soft key 311 in accordance with the length of the drag gesture 312 (as indicated by reference numeral 304).

In processing the repeated inputting of the character allocated to the first soft key 311, the number of times (for example, 3) the character is processed to be repeatedly input may be displayed on an area 314 of the character input window 302. The number of times the character is repeatedly input may also be displayed on an area 313 where the drag gesture is generated. Further, in processing the repeated inputting of the character (or the number) allocated to the soft key in accordance with the length of the drag gesture, the repeated inputting may be processed by further considering the direction of the drag gesture. For example, when the drag gesture is input along a first direction and then switches to a second direction opposite to the first direction, the controller 110 may subtract at least one character (or number) displayed on the character input window 302 in accordance with the length of the drag gesture input along the second direction.

Figure 4:
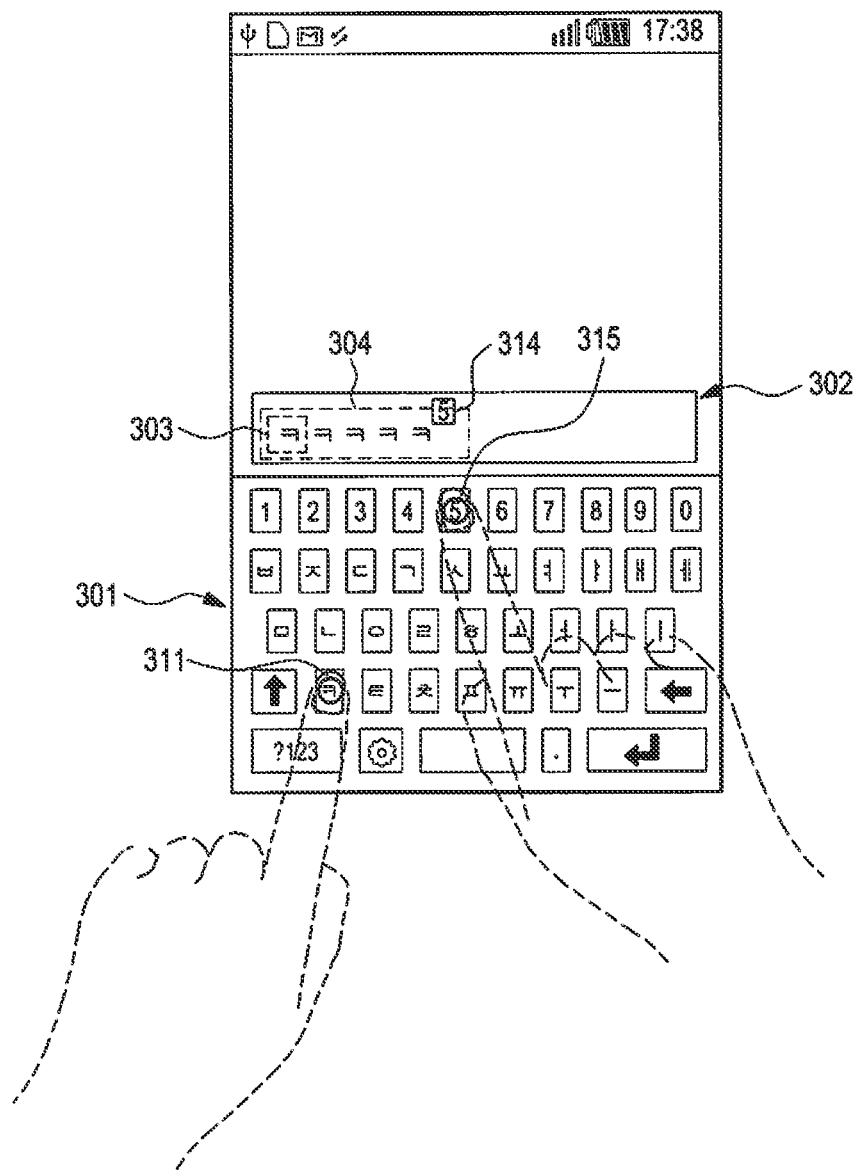
FIG. 4 illustrates another example of an operation of inputting a character by a character input method according to an embodiment of the present invention.

As another example, if a touch input is generated on a second soft key to which a number is allocated after a touch input has been generated on a first soft key and not released, the controller 110 may process the repeated inputting of the character allocated to the first soft key by an amount corresponding to the number allocated to the second soft key. For example, as shown in FIG. 4, the controller 110 identifies that a touch input of the second soft key 315 to which the number "5" is allocated is generated after a touch input is generated on the first soft key 311 to which the character "ㄱ" is allocated and then is not released, and may process the repeated inputting of the character 303 allocated to the first soft key 311 according to the number allocated to the second soft key 315 (as indicated by reference numeral 304).

In processing the repeated inputting of the character allocated to the first soft key 311, the number (for example, 5) by which the repeated inputting of the character is processed may be displayed on the area 314 of the character input window 302.

In this way, the repeated inputting of the character (or the number) allocated to the soft key where the touch input is generated may be accomplished. Further, the controller 110 may change the display the input character on the character input window 302 to reflect whether the repeated inputting of the character is completed or not. For example, a character of which the repeated inputting is completed and a character of which the repeated inputting is currently being processed may be displayed by the different colors or expressions (for example, an underline or a thickness of the characters) of the characters.

The methods according to embodiments of the present invention may be implemented in the form of computer-executable program commands and recorded in non-transitory computer-readable media. The non-transitory computer-readable media may store program commands, data files, data structures and the like separately or in combination. The program commands recorded in the media may be the program commands which are specially designed and configured for implementing an embodiment of the present invention, or may be the program commands which are known to those of ordinary skill in the field of computer software.

The methods according to embodiments of the present invention implemented in the form of program commands may be more permanently stored in the storage 150 of the device 100, and then temporarily stored in the RAM 113 embedded in the controller 110 for execution of the methods. Accordingly, in response to the program commands implementing the methods, the controller 110 may control the hardware components included in the device 100, temporarily or permanently store in the storage 150 the data generated while executing the methods, and provide UIs needed to execute the methods, to the touch screen controller 172.

Figure 5:
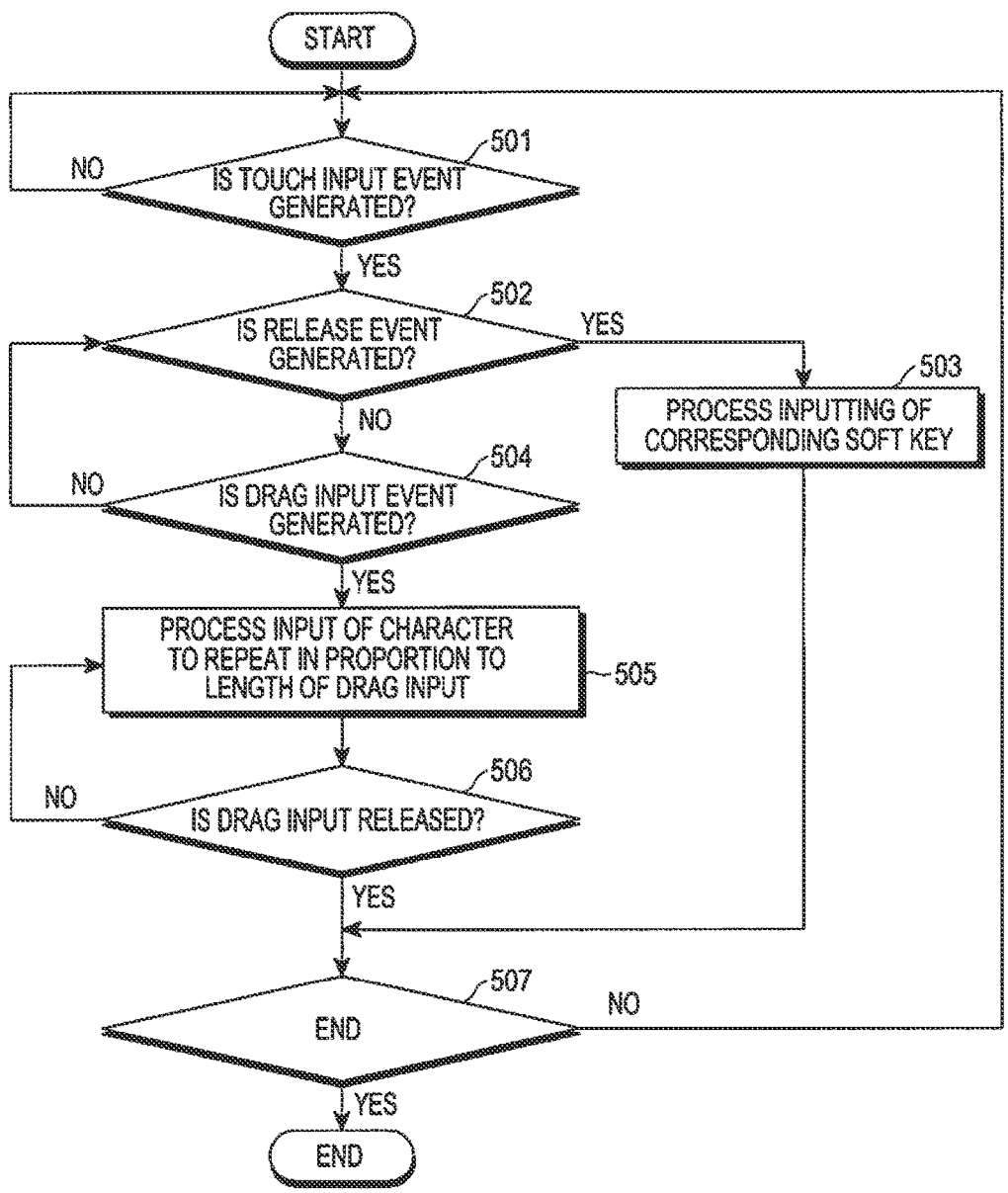
FIG. 5 is a flowchart showing an operation sequence of a method of processing inputting of a character, according to an embodiment of the present invention.

FIG. 5 is a flowchart showing an operation sequence of a method of processing inputting of a character according to an embodiment of the present invention.

The method of processing the inputting of a character according to an embodiment of the present invention may start an operation thereof when the soft keyboard for inputting a character and a number, that is, the soft keyboard 301 in FIG. 3 including the plurality of soft keys, is activated. For example, the controller 110 may start an operation of the method of processing the inputting of a character according to an embodiment of the present invention in response to the soft keyboard being activated by a memo application or a messaging application.

Returning to FIG. 5, in step 501, the controller 110 detects whether a touch input is generated on the soft keyboard. When a touch input event is generated on an area in the soft keyboard, the touch screen 171 provides the coordinates of the area to the controller 110 through the touch screen controller 172. Accordingly, the controller 110 can identify whether the touch input event is generated on the soft keyboard. When a touch input event is detected, the controller 110 progresses to step 502.

In step 502, the controller 110 identifies whether a release event for the touch input event is generated or not. That is, when there is no further input at the coordinates of the area where the touch input event was generated, i.e., if the touch input has neither dragged nor continued, the controller 110 determines that the release event is generated. If a release event is generated, the controller 110 progresses to step 503. In step 503, the controller 110 identifies the coordinates of the area where the touch input event and release event were generated, determines the soft key allocated to the area corresponding to the identified coordinates, and detects a character allocated to the corresponding soft key. The controller 110 provides data for outputting the detected character on the character input window 302 to the touch screen controller 172, and the touch screen controller 172 outputs the received data through the character input window 302 provided on the touch screen 171.

If a release event is not generated in step 502, the controller 110 determines whether the touch input is a drag gesture event in step 504. That is, the controller 110 identifies whether there is input continuously at the coordinates of the area where the touch input event was generated, or if the input coordinates deviate from a range of a predetermined length defined for the drag gesture. The controller 110 progresses to step 505 when it is determined that the drag gesture is generated, or returns to step 502 when it is determined that the drag gesture is not being generated.

In the loop of steps 505 and 506, the controller 110 repeats the input of the character selected by the touch input event, where the number of repetitions is in proportion to the length of the drag gesture. That is, by looping through steps 505-506, the controller 110 determines the length of the drag gesture, and, by determining how many predetermined length units fit within the determined length, calculates the number of times by which the character is repeatedly input. In terms of the proportion of drag length to repetitions, the controller 110 may add, for example, one repetition for each soft key the drag gesture goes through on the soft keyboard. Referring to FIG. 3, the drag gesture 312 starts from a touch input of the soft key 311 to which the character "ㄱ" is allocated, and, when the drag gesture 312 goes through the neighboring soft key to which the character "ㅌ" is allocated, the controller 110 adds one to the number of times by which the character is repeatedly input, and again, as the drag gesture 312 continues through the next soft key, to which the character "ㅊ" is allocated, the controller adds another repetition, so that the number of times by which the character is repeatedly input may be determined as 3.

In step 505, the controller 110 may display the determined number of times by which the character is repeatedly input on an area 313 where the drag gesture is generated, as shown in FIG. 3. As another example, the controller 110 may display the determined number of times by which the character is repeatedly input on the area 314 where the character 303 input to the character input window 302 is displayed, as shown in FIG. 3. The number of times by which the character is repeatedly input may be displayed both on the area 313 where the drag gesture is generated and on the area 314 where the character 303 input to the character input window 302 is displayed, at the same time.

Figure 6:
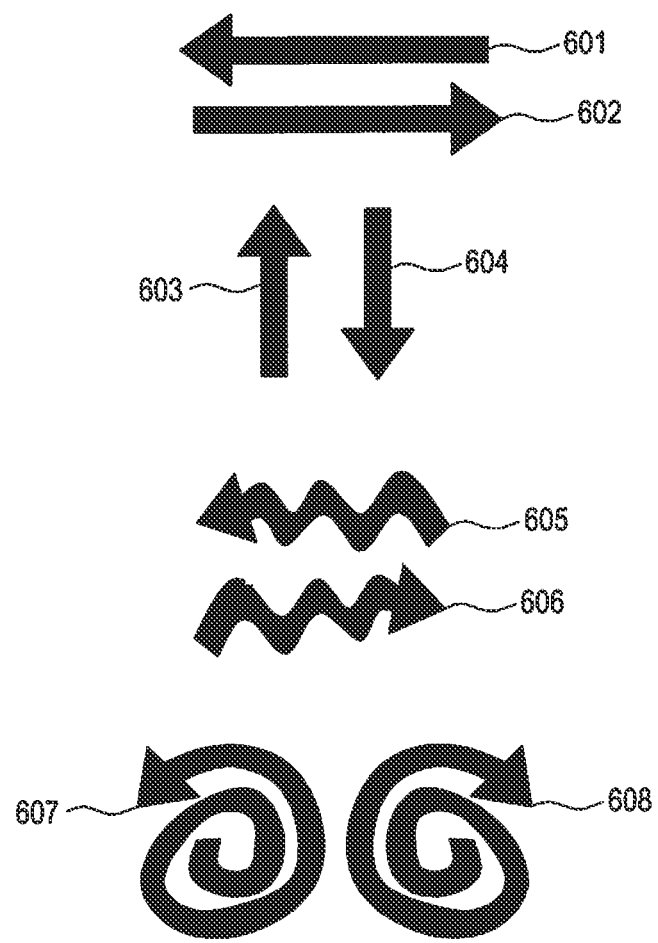
FIG. 6 illustrates types of drag inputs used in a method of processing inputting of a character according to an embodiment of the present invention.

The shape made by the drag gesture can form various types of patterns, as the examples in FIG. 6 show. In this embodiment, the controller 110 calculate the number of times by which the character is repeatedly input, corresponding to a length by which the drag gesture is input, regardless of the shape or type of drag gesture.

However, in other embodiments, the controller 110 recognizes the type, direction, and/or shape of the drag gesture, and calculates the number of times by which the character is repeatedly input differently, depending on the type, direction, and/or shape of the drag gesture. As the simplest example, when the drag gesture is input by first and second patterns 601 and 602 in FIG. 6, the number of times by which the character is repeatedly input may be calculated by adding one to the number of times by which the character is repeatedly input, according to a predetermined length unit (for example, the length of the area where a soft key is provided). When the drag gesture is input by third and fourth patterns 603 and 604 shown in FIG. 6, the number of times by which the character is repeatedly input may be calculated by adding a predetermined size (for example, 5, 10, or the like) to the number of times by which the character is repeatedly input, according to a predetermined length unit (for example, the length of the area where a soft key is provided). When the drag gesture is input by fifth and sixth patterns 605 and 606 shown in FIG. 6, the number of times by which the character is repeatedly input may be calculated by adding one to the number of times by which the character is repeatedly input, whenever the direction of the drag gesture is changed. When the drag gesture is input by seventh and eighth patterns 607 and 608 shown in FIG. 6, the number of times by which the character is repeatedly input may be calculated by adding one to the number of times by which the character is repeatedly input, according to a predetermined length unit (for example, 0.5 cm).

Further, the controller 110 may determine the trajectory of the one or more predetermined gestures on the touch screen and display the trajectory of the one or more predetermined gestures on the touch screen in step 505. As indicated by the loop of steps 505-506, step 505 is repeatedly performed until the drag input is completed, that is, until the release event for the drag input is generated, as shown by the "YES" line out of step 506, which leads to step 507, and the "NO" line out of step 506, which brings the method back to step 505 to continue repeating the character.

In step 505, the controller 110 may calculate the number of times by which the character is repeatedly input by considering the direction and/or change in direction of the drag gesture. For example, while the drag gesture is being input in a first direction (for example, 601, 603, 605, and 607), and the input direction of the drag gesture switches into a second direction, the controller 110 may subtract at least one character (or number) displayed on the character input window 302 in accordance with the length of the drag gesture input in the second direction, and then may subtract one or more characters (or numbers) from the display on the character input window 302.

The controller 110 may display a character in the character input window 302 after the release event for the drag input is generated in step 506 or the input of the soft key is processed through step 503 (hereinafter, such a character is referred to as a 'completely input character') differently from a character displayed on the character input window 302 during the drag input event (hereinafter, such a character is referred to as a 'character being input'). For example, the completely input character and the character being input may be displayed with different colors, formatting, punctuation, or expressions (for example, size, underline, or thickness).

The above-described method of processing the inputting of the character according to an embodiment of the present invention is terminated when the operation of the soft keyboard 301 is terminated in step 507. For example, the terminating operation may occur when the end key is input by a user or based on an operation of a character input application according to an operation policy of a terminal. The operation policy of the terminal is the policy under which the character input application, when not being shown on a display for a predetermined time period, finishes and/or maintains a standby state or an inactive state.

Figure 7:
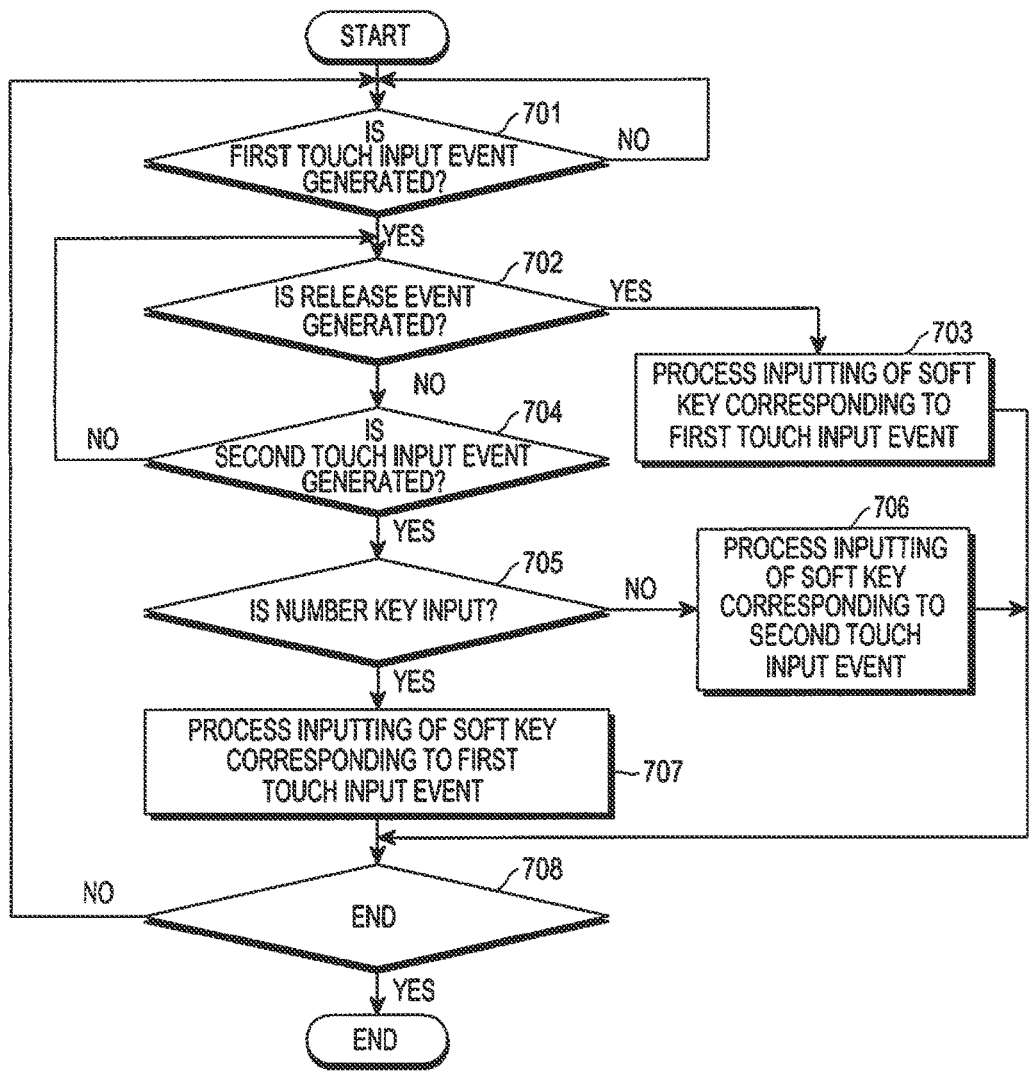
FIG. 7 is a flowchart showing an operation sequence of a method of processing inputting of a character according to another embodiment of the present invention.

FIG. 7 is a flowchart showing an operation sequence of a method of processing inputting of a character, according to another embodiment of the present invention.

The method of processing the inputting of a character according to another embodiment of the present invention starts an operation thereof when a soft keyboard for inputting a character and a number, such as the soft keyboard 301 in FIGS. 3 and 4, is activated. FIG. 4 is an example of the operation of the method in FIG. 7 of processing inputting of a character according to another embodiment of the present invention.

First, in step 701, the controller 110 detects whether a first touch input is generated on the soft keyboard. That is, when the first touch input is generated on an area where the soft keyboard is formed, the touch screen 171 provides coordinates of the area where the first touch input event is generated to the controller 110 through the touch screen controller 172. Accordingly, the controller 110 is informed when the first touch input event is generated on the soft keyboard. When the first touch input event is generated on the soft keyboard, the controller 110 progresses to step 702.

In step 702, the controller 110 determines whether a release event for the first touch input event is generated or not. That is, when the coordinates of the area where the touch input event was generated is not input from the touch screen 171 anymore, the controller 110 determines that the release event is generated. When the release event is generated, the controller 110 progresses to step 703. In step 703, the controller 110 identifies the coordinates of the area where the release event is generated, that is, the finally-input coordinates of the area where the touch input event is generated. The controller 110 identifies the soft key allocated to the area, such as the area 311, and the corresponding soft key corresponding to the character "ㄱ". The controller 110 provides data for outputting the detected character, such as "ㄱ", through the character input window 302 provided on the touch screen 171, to the touch screen controller 172, and the touch screen controller 172 outputs the received data through the character input window 302 provided on the touch screen 171.

When the release event is not generated in step 702, the controller 110 progresses to step 704. In step 704, the controller 110 detects whether a second touch input event is generated on the soft keyboard 301 while the first touch input event is maintained. For example, FIG. 4 shows a second touch input being generated on 315 (the soft key for "5") while the first touch input is being maintained on 311 (the soft key for "=1"). When the second touch input event is generated while the first touch input event is maintained, the controller progresses to step 705.

In step 705, the controller 110 identifies whether the second touch input event is generated in an area to which a number key is allocated. When the second touch input event is not generated in the area to which the number key is allocated, the controller 110 progresses to step 706 which processes inputting of a soft key allocated to the area where the second touch input event is generated. If the second touch input event is generated in an area to which a number key is allocated, the controller 110 in step 707 detects a value of the number key allocated to the area where the second touch input event is generated and performs an operation of inputting a character allocated to the area where the first touch input event is generated, by the value of the number key.

In step 707, the controller 110 may display the value of the detected number key on the area 311 where the first touch input event is generated. As another example, the controller 110 may display the value of the detected number key on the area 314 where the character 303 input to the character input window 302 is displayed. The value of the detected number key may be displayed at the same time on both the area 311 where the first touch input event is generated and the area 314 where the character 303 input to the character input window 302 is displayed.

Further, the controller 110 may display a character on the character input window 302 after processing step 703, step 706, and step 707 (i.e., a completely input character) differently than a character displayed on the character input window 302 in response to generation of the zap touch input event (i.e., a character being input). For example, the completely input character and the character being input may be displayed with different colors, formatting, punctuation, or expressions (for example, size, underline, or thickness).

In step 708, the above-described method of processing the inputting of a character according to another embodiment of the present invention may be repeated until an operation of the soft keyboard 301 finishes, at which point the method ends. For example, the finish operation may be performed when a finish key is input by a user or based on an operation of a character input application according to an operation policy of a terminal.

Although the method of repeatedly inputting the character allocated to the soft key has been described above in embodiments of the present invention as using a drag gesture or a multi-touch input event, the present invention is not limited thereto, and it will be apparent to those skilled in the art that various modifications may be applied. For example, when the touch input event generated in the area where the soft key 311 is provided is continuously maintained for more than a predetermined time period (for example, 1 second), another embodiment of the present invention could interpret that as a command to repeatedly input the character allocated to the soft key.

It will be appreciated that the embodiments of the present invention may be implemented in a form of hardware, software, or a combination of hardware and software. The software may be stored on a non-transitory computer-readable medium as program instructions or computer readable codes executable on the processor. Examples of non-transitory computer readable recording media include magnetic storage media (e.g., ROM, floppy disks, hard disks, etc.) and optical recording media (e.g., CD-ROMs, or DVDs). The computer readable recording media can also be distributed over network coupled computer systems so that the computer readable code is stored and executed in a distributed fashion. This media can be read by the computer, stored in the memory, and executed by a processor. The text processing method of the present invention may be implemented by a computer or portable terminal including a controller and a memory, and the memory may be an example of the computer readable recording medium suitable for storing a program or programs having instructions that implement the embodiments of the present invention. The present invention may be implemented by a program having codes for embodying the apparatus and method described in the claims, the program being stored in a machine (or computer) readable storage medium. The program may be electronically carried on any medium, such as communication signals transferred via wired or wireless connection, and the scope of the present invention suitably includes any equivalents.

An electronic apparatus, such as a portable terminal, may receive and store the program from a program provider on wired or wirelessly connected thereto. The program provider may include a memory for storing a program having instructions to carry out the method, information required for the method, etc., a communication unit for conducting wired or wireless communication, and a controller for controlling transmission of the program. The program provider may provide the program to the electronic apparatus on wired or wirelessly at request of the electronic apparatus. The program provider may also provide the program to the electronic apparatus on wired or wirelessly even without request from the electronic apparatus, e.g., if the electronic apparatus is located within a particular range.

While the present invention has been particularly shown and described with reference to embodiments thereof, it will be understood by those of ordinary skill in the art that various changes in form and details may be made therein without departing from the spirit and scope of the present invention as defined by the following claims and their equivalents.

What is claimed is:

1. A method of repeatedly inputting a character or number in an electronic apparatus, the method comprising:
   identifying a drag gesture relating to a soft key on a soft keyboard displayed on a touch screen of the electronic apparatus;
   determining a number of times corresponding to a length of the drag gesture; and
   inputting the soft key according to the determined number of times corresponding to the length of the drag gesture.

2. The method of claim 1, further comprising:
   displaying on the touch screen the number of times the soft key is input.

3. The method of claim 2, wherein the number of times the soft key is input is displayed on the soft keyboard.

4. The method of claim 2, wherein the number of times the soft key is input is displayed on a character input window.

5. The method of claim 1, further comprising:
displaying a trajectory of the drag gesture on the touch screen.

6. The method of claim 1, wherein determining the number of times corresponding to the length of the drag gesture comprises:
when the one or more predetermined gestures comprises a first gesture in a first direction and a second gesture in a second direction opposite to the first, subtracting a number corresponding to a length of the second gesture from the determined number of times.

7. The method of claim 1, further comprising:
displaying a character being input differently from a completely input character on the character input window.

8. A method of repeatedly inputting a character or number in an electronic apparatus, the method comprising:
identifying a first touch input event of a character soft key on a soft keyboard displayed on a touch screen of the electronic apparatus;
before there is a release event corresponding to the first touch event, identifying a touch drag input event on the soft keyboard; and
inputting the character soft key a number of times corresponding to a length of the touch drag input.

9. The method of claim 8, comprising:
displaying on the touch screen the number of times the character soft key is input.

10. The method of claim 9, the number of times the character soft key is input is displayed on the soft keyboard.

11. The method of claim 9, wherein the number of times the character soft key is input is displayed on a character input window.

12. An electronic apparatus comprising:
a touch screen configured to display information and to detect a touch input event by a user;
at least one controller; and
a memory configured to store at least a character input program, wherein the character input program comprises instructions configured to be executed by the at least one controller, the instructions for performing the steps of:
identifying a predetermined drag gesture relating to a soft key on a soft keyboard displayed on the touch screen;
determining a number of times corresponding to a length of the drag gesture; and
inputting the soft key according to the determined number of times corresponding to the length of the drag gesture.

13. The electronic apparatus of claim 12, wherein the character input program further comprises instructions for performing the step of:
displaying on the touch screen the determined number of times the key is input.

14. The electronic apparatus of claim 13, wherein the determined number of times is displayed on the soft keyboard.

15. The electronic apparatus of claim 13, wherein the determined number of times is displayed on a character input window.

16. The electronic apparatus of claim 13, wherein the character input program further comprises instructions for performing the step of:
displaying a trajectory of the gesture on the touch screen.

17. An electronic apparatus comprising:
a touch screen configured to display information and to detect a touch input event input by a user;
at least one controller; and
a memory configured to store at least a character input program, wherein the character input program comprises instructions configured to be executed by the at least one controller, the instructions for performing the steps of:
identifying a first touch input event of a character soft key on a soft keyboard displayed on the touch screen;
before there is a release event corresponding to the first touch event, identifying a touch drag input event on the soft keyboard; and
inputting the character soft key a number of times corresponding to a length of the touch drag input.

18. The electronic apparatus of claim 17, wherein the character input program further comprises instructions for performing the step of:
displaying the number of times the character soft key is input.

19. The electronic apparatus of claim 18, wherein the number of times the character soft key is input is displayed on the soft keyboard.

20. The electronic apparatus of claim 18, wherein the number of times the character soft key is input is displayed on a character input window.

* * * * *